United States Patent

Benn

[11] Patent Number: 6,064,661
[45] Date of Patent: May 16, 2000

[54] RADIO COMMUNICATION SYSTEM

[75] Inventor: Howard Peter Benn, Swindon, United Kingdom

[73] Assignee: Motorola, Inc., Schaumburg, Ill.

[21] Appl. No.: 08/875,650

[22] PCT Filed: Oct. 28, 1996

[86] PCT No.: PCT/EP96/04679

§ 371 Date: Jul. 31, 1997

§ 102(e) Date: Jul. 31, 1997

[87] PCT Pub. No.: WO97/21320

PCT Pub. Date: Jun. 12, 1997

[30] Foreign Application Priority Data

Dec. 5, 1995 [GB] United Kingdom .................. 9525868

[51] Int. Cl.[7] .................................................. H04Q 7/36
[52] U.S. Cl. .................. 370/329; 370/347; 455/444
[58] Field of Search .................................. 370/329, 330, 370/331, 328, 332, 333, 321, 336, 347; 455/447, 436, 437, 439, 442, 443, 444

[56] References Cited

U.S. PATENT DOCUMENTS

| | | | |
|---|---|---|---|
| 4,736,453 | 4/1988 | Schloemer | 455/450 |
| 5,230,082 | 7/1993 | Ghisler et al. | 455/438 |
| 5,265,263 | 11/1993 | Ramsdale | 455/444 |
| 5,345,499 | 9/1994 | Benveniste | 455/449 |
| 5,394,158 | 2/1995 | Chia . | |
| 5,396,645 | 3/1995 | Huff | 455/441 |
| 5,457,810 | 10/1995 | Ivanov et al. | 455/444 |
| 5,475,868 | 12/1995 | Duque-Anton et al. . | |
| 5,548,806 | 8/1996 | Yamaguchi et al. | 455/444 |
| 5,550,898 | 8/1996 | Abbasi et al. | 455/449 |
| 5,640,678 | 6/1997 | Ishikawa et al. | 455/449 |
| 5,659,879 | 8/1997 | Dupuy | 455/422 |
| 5,678,185 | 10/1997 | Chia . | |
| 5,722,072 | 2/1998 | Crichton et al. | 455/437 |

FOREIGN PATENT DOCUMENTS

WO 93/12589A1  6/1993  WIPO .

*Primary Examiner*—Douglas W. Olms
*Assistant Examiner*—Ken Vanderpuye
*Attorney, Agent, or Firm*—Heather L. Creps

[57] ABSTRACT

A radio communications system that utilizes multiple cells to provide radio communication services to a plurality of mobile stations. In the cells that service high concentrations of mobile stations within a very small geographic area, such as large office buildings, there are provided a plurality of radio frequency capsules within the geographic area serviced by the cell. In addition to having a base site for providing Broadcast Control Channel(BCCH), the cell contains multiple RF capsules for transmitting and receiving traffic channels as well as receiving Random Access Channel(RACH) bursts from a plurality of mobile stations in a portion of the geographic area serviced by the base site. The RF capsules do not provide a BCCH, rather the BCCH is provided by a microcell transceiver that is servicing the particular cell.

3 Claims, 4 Drawing Sheets

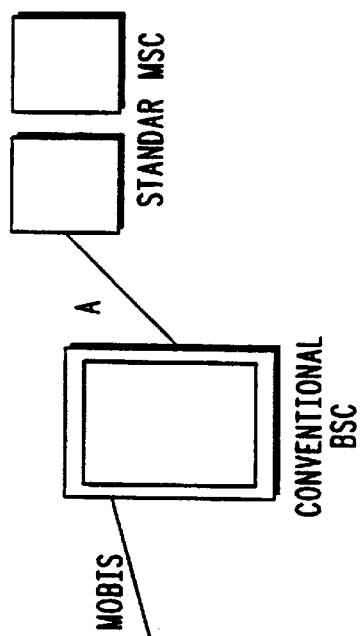
FIG. 1 —PRIOR ART—
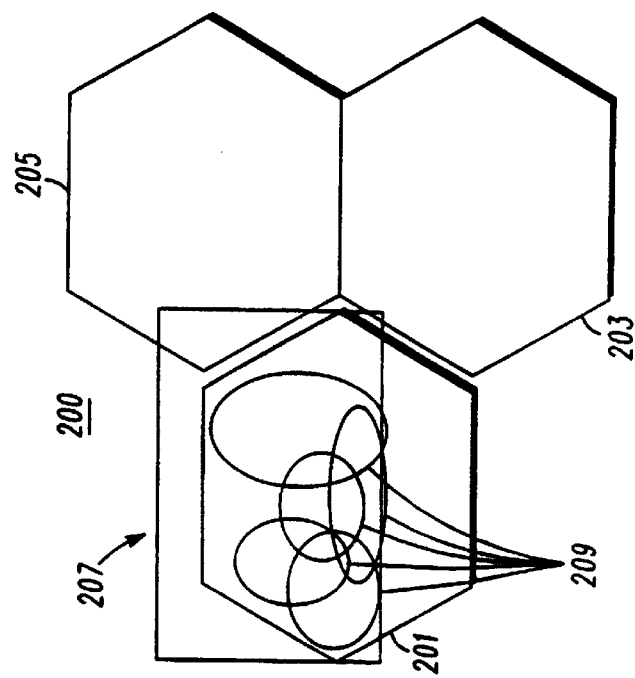
FIG. 2
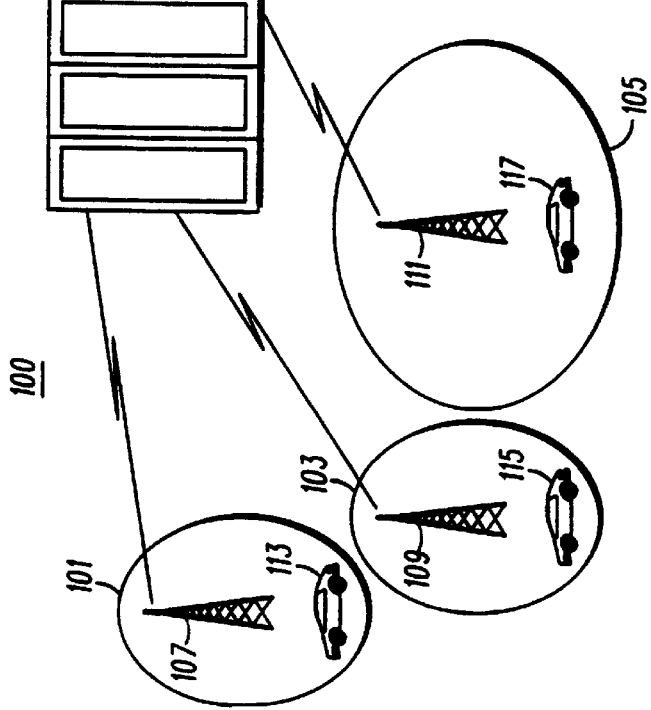

RADIO COMMUNICATION SYSTEM

FIELD OF THE INVENTION

Generally, this invention concerns radio communication systems and more particularly cellular radio communication systems with use of Radio Frequency (RF) capsules within a standard cell.

BACKGROUND OF THE INVENTION

Traditional cellular systems break down a geographic area into groupings of cells. Each cell provides communication services to mobile stations contained within that cell. In order to provide these services, a base station provides a broadcast control channel upon a predetermined frequency from which all mobile stations contained within the cell can listen. In response, a mobile station can transmit a random access channel burst back to the serving base site where upon the base site allocates a traffic channel for which the mobile station may communicate to the base site for providing communication services such as voice and or data services.

There is an inherent limitation on the number of mobile stations to which a base site may provide communication services. This limitation is determined by the cell size, the frequency reuse pattern of the cell and its surrounding cells and the number of frequencies or traffic channels allocated to the cellular system. In order to increase the capacity provided by a cellular system the physical size of the cells may be reduced, thus, providing more cells within a particular system.

As cellular systems become more prevalent in our society and the usage of the systems increases, there is a need to provide more capacity within the cellular systems. When implementing cellular systems within large buildings there are many sources of interference and also a large concentration of people that could use the system. Traditional systems provide many extremely small cells to provide service to all the users within the building. By providing this plurality of very small cells, there is often a need to hand over more frequently between the cells creating a large amount of overhead communications between cells. Examples of such handover procedures may be found in the Global System for Mobile communications (GSM) recommendations.

Additionally, these systems are extremely sensitive to interference caused by adjacent cells, consequently they are fixed geographically and must be re-planned for each change in the dynamics of the system.

FIG. 1 is an illustration of a cellular communication system 100 that provides communication service in three distinct cellular cells 101, 103 and 105. Each of the three cell sites include a base station 107, 109 and 111 that transmit a broadcast control channel for that particular geographic area defined by the cell. Additionally, each mobile station 113, 115 and 117 contained within the respective cells transmit Random Access Channel (RACH) bursts back to the base site 107, 109 and 111. If the physical size of these cells shrink to a few meters in diameter, the complexity in handing off between a first cell 101 and a second cell 103 become more frequent and more cumbersome in the system architecture. Additionally, cell overlap creates interference problems which are immeasurable by the conventional system and therefore discouraged. Thus in order to properly design such a small system the placement of the cells must be carefully planned and any changes such as office re configuration tearing down walls or just moving furniture within the offices can create enough overlap for which a cellular re plan is required creating a large amount of headache for system implementers.

Thus, it would be advantageous to provide a cellular system that could service a high concentration of users in a small geographic area, such as users in a large office building, without the cumbersome handover procedures and frequency planning procedures that are currently necessary.

SUMMARY OF THE INVENTION

The present invention discloses a radio communication system comprising a first base station for providing radio communication services to a plurality of mobile stations located within a first geographic area, said first base station transmitting a broadcast control channel (BCCH) for said first geographic area and at least a first capsule located within said first geographic area for transmitting traffic channels and receiving traffic channels and random access channels (RACH) to and from said plurality of mobile stations, said at least first capsule for providing coverage over at least a first portion of said first geographic area. If a second capsule is provided the geographic areas covered by the first and the second capsules may significantly overlap.

Additionally, when a mobile station receiving a BCCH from said first base station transmits a RACH, each of said at least a first capsule receives said RACH at a quality level. A controller determines said quality level for each of said at least first capsule and allocates one of said at least a first capsule for said first of said plurality of mobile stations. The controller also builds a matrix indicating propagation loss between each of said at least a first capsule using said quality levels. This radio communication system allows multiple mobile stations to transmit on the same frequency and the same timeslot within the first geographic area.

Inter-capsule handoff is accomplished, when available, by switching assignment of the traffic channel for the first mobile station from the first capsule to the second capsule while maintaining the first frequency and the first timeslot of the traffic channel. Furthermore each of said at least a first capsule further comprises means for selectively providing a BCCH to an unservable portion of the first geographic area when the base station cannot provide a BCCH to said unservable portion.

BRIEF DESCRIPTION OF THE DRAWINGS

FIG. 1 is an illustration of a conventional cellular system that is available in the prior art.

FIG. 2 is an illustration of a cellular system cell layout in accordance with the present invention.

DESCRIPTION OF A PREFERRED EMBODIMENT

Figure 3:
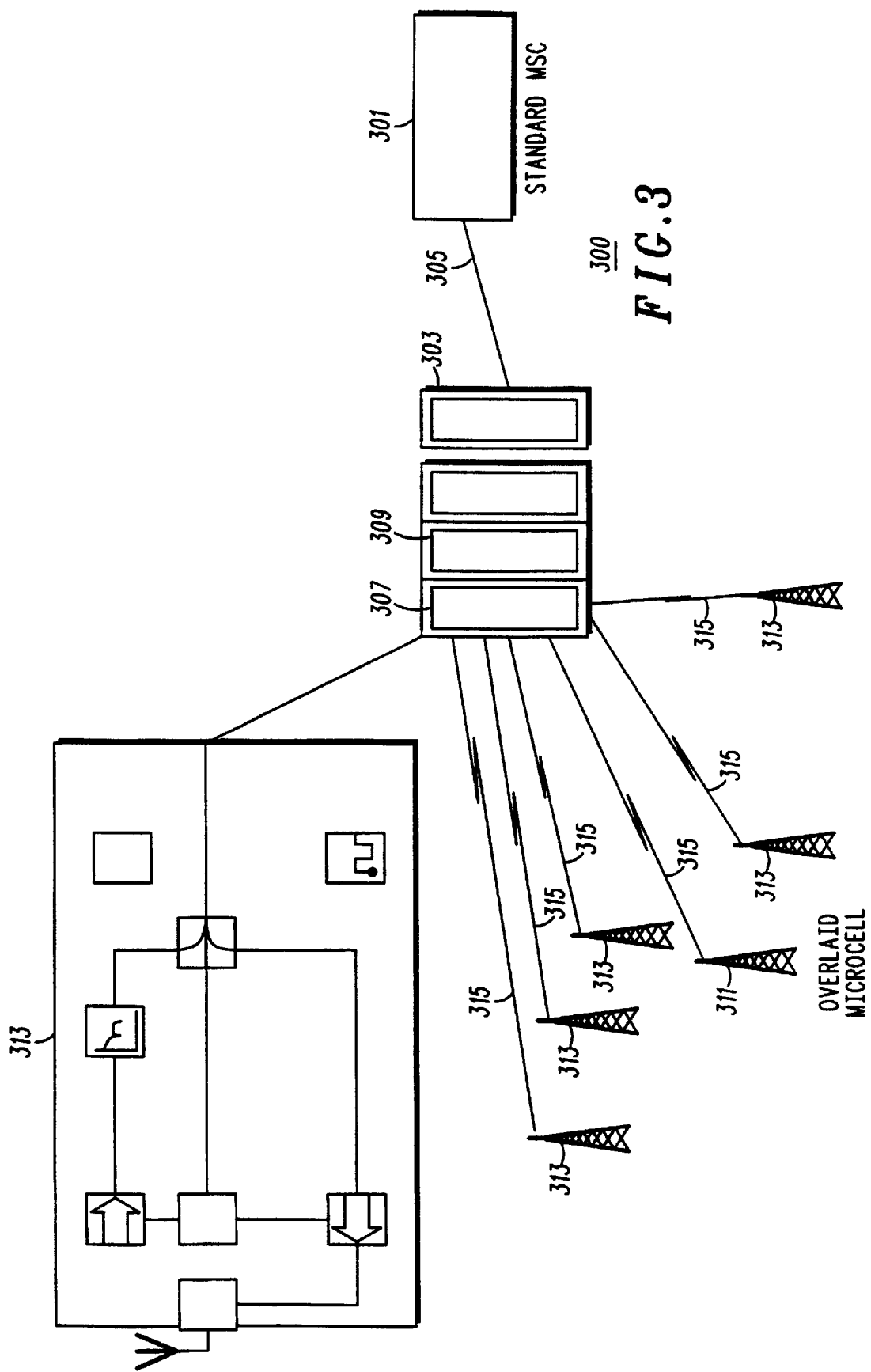
FIG. 3 is an illustration in block diagram form of a cellular communication system in accordance with the present invention.

The preferred embodiment includes a description of a radio communications system that utilises multiple cells to provide radio communication services to a plurality of mobile stations. In the cells that service high concentrations of mobile stations within a very small geographic area, such as large office buildings, there are provided a plurality of radio frequency (RF) capsules within the geographic area serviced by the cell.

In addition to having a base site for providing a Broadcast Control Channel (BCCH), the cell contains multiple RF capsules for transmitting and receiving traffic channels as well as receiving Random Access Channel (RACH) bursts from a plurality of mobile stations in a portion of the geographic area serviced by the base site. The RF capsules do not provide a BCCH, rather the BCCH is provided by the base station that is servicing the particular cell.

During call set up, a mobile transmits a RACH burst. This RACH burst is received by a plurality of RF capsules within the cell. A controller for the cell site determines a quality level for each RACH burst received by the RF capsules. The controller then allocates one of the RF capsules to that particular mobile station. Thereafter, that mobile station communicates to the cell site via the allocated RF capsule on a traffic channel. A traffic channel is defined by at least a first frequency and at least a first time slot.

While the mobile station is transmitting to the allocated RF capsule, the neighboring RF capsules are monitoring these communications for quality. Again the controller responsive to the quality of the monitored communications will switch assignment of the traffic channel for this particular mobile station from the allocated capsule to a newly allocated capsule; preferably maintaining the chosen frequency and time slot of the traffic channel. Thus, the hand-off goes unnoticed by the particular mobile station.

Additionally, the controller builds a matrix indicating propagation loss between each of the plurality of RF capsules. The propagation losses are determined using the quality indications of the RACH burst received by the individual RF capsules. In the preferred embodiment, the matrix contains a list of average propagation delays between each of the RF capsules. By monitoring the propagation loss between each of the capsules, the particular RF capsule being used will know the effect of the frequency interference caused by its particular mobile station on the RF capsules contained within the cell. This propagation loss information allows the controller to dynamically allocate frequency re-use within the same cell.

Furthermore, in large buildings there are often block spots which are unserviceable by the base stations BCCH. In such situations, the preferred embodiment provides a capsule for selectively providing a BCCH to an otherwise unservable portion of the geographic area to which the cell is supposed to provide communication service. For example, in basements, or shielded areas, the selected RF capsule can repeat BCCH information broadcast by the base site into this unserviceable portion of the geographic area thus providing service for that particular area.

FIG. 2 is an illustration of a radio communication system including a first cell 201, a second cell 203 and a third cell 205. A large building 207 is illustrated by a square in which multiple RF capsules 209 are utilized within the first cell 201 to provide radio communication service to a high concentration of mobile stations within a very small geographic area. In this particular configuration, the first cell 201 provides a BCCH and communication coverage for all mobile stations located within the first cell's geographic area illustrated by the hexagon. Within the building 207, there are five RF capsules which are set up to provide traffic channel communication between any mobile subscribers. contained within their coverage area and to receive RACH bursts from the mobile subscribers. The details of controlling these particular capsules are illustrated in FIG. 3. You will note that RF capsules coverage is illustrated by the irregular shaped circles 209 that may severely overlap one and other without any repercussions on the quality of service provided to the mobile stations within that area.

FIG. 3 is an illustration of a base site in accordance with the present invention. The base site 300 contains a standard MSC (mobile switching centre) 301 that is interconnected to a conventional BSC (Base site controller 303 via an A-line 305. Additionally, the base site 300 includes at least one low cost Base Transceiver System (BTS) 307 and a controller 309 for controlling the inter-capsule handoffs and assignment of mobile stations to particular capsules as discussed below. The base site 300 additionally includes an overlaid microcell transceiver 311 for providing a BCCH for the entire cell area as well as traditional cellular service in areas outside of the coverage of the RF capsules. There are a plurality of RF capsules 313 located in the base site 300 for providing the service as illustrated in FIG. 2. In the preferred embodiment, the RF capsule is of a particularly small geometry and are connected to the base transceiver system via a 270 Kilo Bit Per Second (KBPS) transmission line 315. Details of the system architecture may be found in co-pending patent application CE30155P filed on Dec. 4, 1995 by Motorola Ltd.

The overlaid microcell transceiver 311 continuously broadcasts a BCCH to mobile stations served in the fixed geographic area 201 of FIG. 2. In response a mobile station desiring to set up a call transmits a random access channel burst from its location. The RACH burst is received by any of the RF capsules 313 that are within distance to monitor the RACH burst from the mobile. Each of the RF capsules 313 receives the RACH bursts then either determines the quality of the received burst or transmits the received burst back to the BTS 307. Controller 309 then analyses the results or alternatively determines the quality of the received RACH bursts from each of the RF capsules and determines the most appropriate RF capsule 313 to provide service to the mobile station.

In the preferred embodiment the quality of the received RACH burst is determined by the received RSSI and the effective bit error rate. The RF capsule 313 which provides the highest quality is chosen to provide service to the RF capsule. If the quality of all of the RACH bursts received are less than a given threshold, then the radio communication service will be provided by the overlaid micro cell transceiver 311 in a traditional cellular manner.

Figure 4:
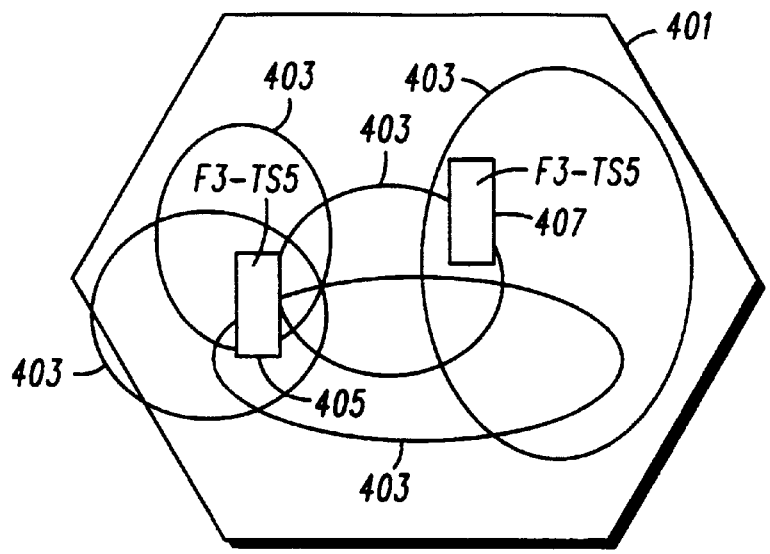
FIG. 4 is an illustration of a cell in a particular configuration in accordance with the present invention.

The main reason for utilizing capsules instead of traditional cells is to reduce the handover overhead and to improve the re use factor from a conventional cellular system. A list of known good channels is maintained by the controller 309. FIG. 4 is an illustration of a cell utilizing the base site 300 of FIG. 3. Here the microcell coverage area 401 is provided by the overlaid microcell transceiver 311 in a traditional cellular manner. Additionally, the overlaid microcell transceiver 311 broadcasts the BCCH for all RF capsules 403 contained within the geographic area of coverage area denoted by 401. In this particular example 5 RF capsules 403 are illustrated. These RF capsules 403 provide traffic channel transmission and reception as well as RACH burst reception are controlled by a controller 309 of FIG. 3.

Figure 5:
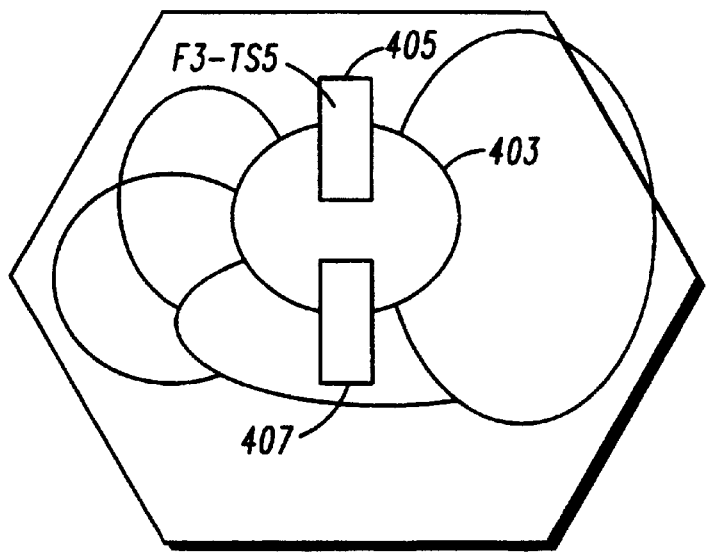
FIG. 5 is an illustration of a cell in a particular configuration in accordance with the present invention.

In FIG. 4, there are two mobile stations 405 and 407 within the cell area 401 each being served by an independent RF capsule 403. Both mobile stations are utilizing frequency 3 and time slot 5 to broadcast their traffic channels back to their respective RF capsules. This can be provided because of the technique discussed below of known propagation loss between the RF capsules. As the mobile station 405 moves towards the boundary of its present RF capsule 403, ideally the mobile station will maintain the same frequency and time slot when it switches service to another RF capsule 403. However, as both mobile stations 405, 407 move towards the same RF capsule, only one of the mobile stations may be served by the same frequency and time slot. The controller 309 determines which one is better served by the frequency and time slot and switches control from the first RF capsule to a second RF capsule 403. As illustrated in FIG. 5, the second mobile station 407 was determined not to have priority over the first mobile station 405 and instead was handed over in a conventional manner. Thus, changing its frequency and or time slot with assistance of the mobile. As can be seen from the aforementioned example, the hand-offs can be provided in a non obtrusive manner to mobile stations 405 and at worse case in a conventional manner as it would perform on mobile station 407.

Figure 6:
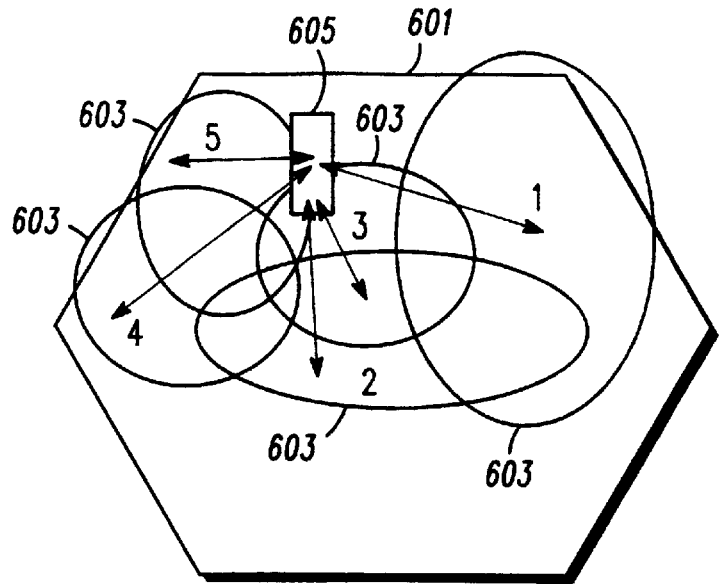
FIG. 6 is an illustration of a particular cell configuration in accordance with the present invention.

As previously mentioned, one aspect of the present invention is to provide a propagation map in the controller 309 so that propagation losses between RF capsules 403 contained within a cell 401 are known. FIG. 6 is an illustration of a cell from which propagation maps may be developed. Here, the cell 601 contains 5 RF capsules 603. When a mobile station 605 transmits a RACH burst to initiate a call set up, each of the five RF capsules receive the RACH burst. The quality of the RACH information received by each of the RF capsules are gathered over a period of time. This information is then used to predict the probability of interference generated between the cells in a known manner. In the preferred embodiment the controller 309 generates a matrix indicating the average propagation loss between each of the RF capsules 603.

After determining the average propagation loss between cells, one can predict when the same frequency may be used within the cell 601 based on propagation losses between RF capsules. For example, a mobile station is located in RF capsule 1 of FIG. 6 and a second mobile station is operating within RF capsule 4. If the average propagation loss between RF capsule 4 and RF capsule 1 exceeds a threshold, then the same frequency may be re used within cell 601 for the two mobile stations. In the preferred embodiment the threshold is equal to 70 db.

Figure 7:
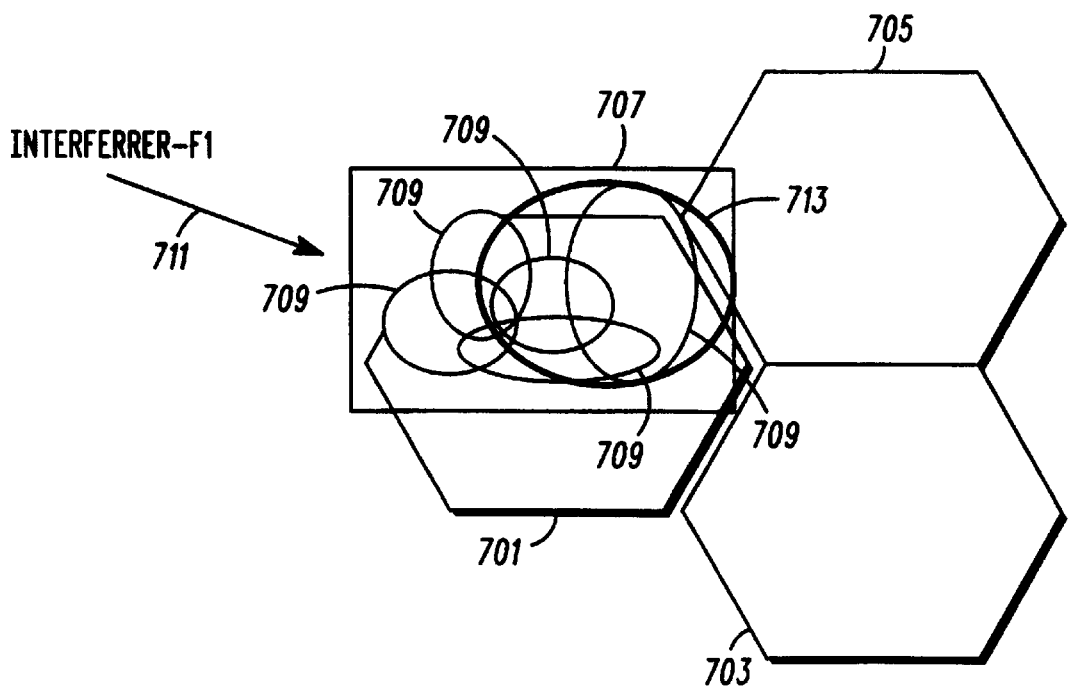
FIG. 7 is an illustration of a cell configuration in accordance with the present invention.

FIG. 7 is an illustration of a radio communication system having 3 cells 701 703, 705. Again, a large building is provided 707 with RF capsules providing cellular service to a large concentration of mobile stations within a small geographic area, as illustrated by RF capsules 709. In this particular case, there is an external interference caused by frequency 1 as indicated by the large arrow 711 intruding into the cell 701. This interference may be caused by an adjacent cellular system or some other interference source. Traditionally, this interference could only be detected by the cell transceiver serving entire cell 701. However, in this particular case since RF capsules are being used to receive smaller areas, the frequency F1 may be used in the area illustrated by circle 713 of FIG. 7. The use of frequency F1 is possible because of the isolation within the cell 701 created by the building 707 and other isolation creators.

In certain situations, the serving micro cell 701 may not be able to broadcast the BCCH efficiently throughout the entire area serviced by RF capsules due to isolation and propagation losses in areas such as underground structures and metal surround structures as is well known in the art. In order to overcome this the RF capsules have the ability to be switchably to repeat the BCCH data re transmitting it in a localised isolated area in a traditional cellular manner.

Thus, as can be seen the foregoing discussion the radio communication system of the present invention provides an improved hand-off for high concentrations of mobile stations in a small geographic area as well as easing of the cellular planning requirements of the traditional cellular systems.

What is claimed is:

1. A radio communication system comprising:
   a first base station for providing radio communication services to a plurality of mobile stations located within a first geographic area, said first base station transmitting a broadcast control channel (BCCH) for said first geographic area;
   at least a first capsule located within said first geographic area for transmitting traffic channels and receiving traffic channels and random access channels (RACH) to and from said plurality of mobile stations, said at least first capsule for providing coverage over at least a first portion of said first geographic area and configured to receive the RACH from the first of said plurality of mobile stations at a quality level; and
   a controller comprising
      first means for monitoring a communication quality of a first traffic channel, the first traffic channel having at least a first frequency and a first timeslot, second means for monitoring the communication quality of the first traffic channel through a second capsule, means, responsive to the first and second means for monitoring, for switching assignment of the traffic channel from the first capsule to the second capsule while maintaining the first frequency and the first timeslot of the traffic channel, and
      a matrix indicating, using said quality level, a propagation loss between said at least first capsule and the first of said plurality of mobile stations, the controller allocating said at least first capsule to the first of said plurality of mobile stations.

2. The radio communication system in accordance with claim 1 wherein the second capsule is located within said first geographic area for providing coverage over at least a second portion of said first geographic area, and wherein said first portion of said first geographic area and said second portion of said first geographic area may overlap significantly.

3. The radio communication system in accordance with claim 2 wherein a first mobile station is transmitting on a first radio frequency during a first timeslot and a second mobile station is transmitting on the same first radio frequency and the same first timeslot within the first geographic area.

* * * * *